United States Patent
Nainar et al.

(10) Patent No.: US 12,126,691 B2
(45) Date of Patent: Oct. 22, 2024

(54) OBSERVABILITY PROFILE MAPPING FOR TELEWORKER OBSERVABILITY

(71) Applicant: Cisco Technology, Inc., San Jose, CA (US)

(72) Inventors: Nagendra Kumar Nainar, Morrisville, NC (US); Carlos M. Pignataro, Cary, NC (US); David John Zacks, Vancouver (CA); Thomas Szigeti, Vancouver (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

(21) Appl. No.: 17/747,165

(22) Filed: May 18, 2022

(65) Prior Publication Data
US 2023/0376879 A1 Nov. 23, 2023

(51) Int. Cl.
*H04L 67/306* (2022.01)
*H04L 43/0876* (2022.01)
*H04L 67/141* (2022.01)

(52) U.S. Cl.
CPC ........ *H04L 67/306* (2013.01); *H04L 43/0876* (2013.01); *H04L 67/141* (2013.01)

(58) Field of Classification Search
CPC .. H04L 67/306; H04L 67/141; H04L 43/0876
USPC ....................................................... 709/228
See application file for complete search history.

(56) References Cited

U.S. PATENT DOCUMENTS

| 7,243,369 | B2* | 7/2007 | Bhat | H04L 67/02 726/8 |
| 10,237,298 | B1* | 3/2019 | Nguyen | H04L 63/10 |
| 11,356,419 | B1* | 6/2022 | Nosalis | G06F 16/245 |
| 2010/0191612 | A1* | 7/2010 | Raleigh | H04L 67/55 455/406 |
| 2011/0213836 | A1* | 9/2011 | Niven-Jenkins | H04L 65/612 709/203 |
| 2016/0335484 | A1* | 11/2016 | Xie | H04N 7/181 |

(Continued)

FOREIGN PATENT DOCUMENTS

CN 102365890 B * 6/2014 ........... G06F 15/177

OTHER PUBLICATIONS

Stefano Gridelli, Endpoint Network Monitoring for Telework, NetBeez, Dec. 2, 2020, 8 pages; https://netbeez.net/blog/endpoint-monitoring/.

(Continued)

*Primary Examiner* — Ruolei Zong
(74) *Attorney, Agent, or Firm* — Edell, Shapiro & Finnan, LLC

(57) ABSTRACT

A connection request is received from a user device associated with a user. The connection request includes an identifier associated with a profile associated with the user, the profile being a static profile or a dynamic profile. An observability profile associated with the user is identified based on the profile when the profile is a static profile and based on a current traffic profile associated with the user device when the profile is a dynamic profile. Measurements associated with a data session are executed for the user device based on the observability profile and one or more configurations are adjusted in a network to improve performance of the data session based on the measurements.

20 Claims, 6 Drawing Sheets

(56) References Cited

U.S. PATENT DOCUMENTS

| | | |
|---|---|---|
| 2019/0260663 A1 | 8/2019 | Pueblas |
| 2020/0204643 A1 | 6/2020 | Zhou et al. |
| 2021/0194908 A1 | 6/2021 | Wu et al. |
| 2021/0314238 A1 | 10/2021 | Cioffi et al. |
| 2022/0103597 A1* | 3/2022 | Gobena ............... H04L 63/0236 |
| 2023/0104116 A1* | 4/2023 | Nosalis ............... H04L 67/1004 |
| | | 726/15 |

OTHER PUBLICATIONS

Craig Hyps, "ISE Profiling Design Guide," CISCO, edited Aug. 3, 2021, 335 pages; https://community.cisco.com/t5/security-documents/ise-profiling-design-guide/ta-p/3739456.

* cited by examiner

OBSERVABILITY PROFILE MAPPING FOR TELEWORKER OBSERVABILITY

TECHNICAL FIELD

The present disclosure relates to full stack observability.

BACKGROUND

As many workplaces are moving toward an environment in which employees telework at least part of the time, the increase in the percentage of the workforce that is connecting remotely introduces new types of information technology (IT) and other related challenges. When an employee is working from the office, the end-to-end infrastructure is owned and managed by the IT/workplace. However, when the employee is teleworking, part of the infrastructure used to perform teleworking activities is outside the scope of the IT/workplace.

DESCRIPTION OF EXAMPLE EMBODIMENTS

Overview

Figure 1:
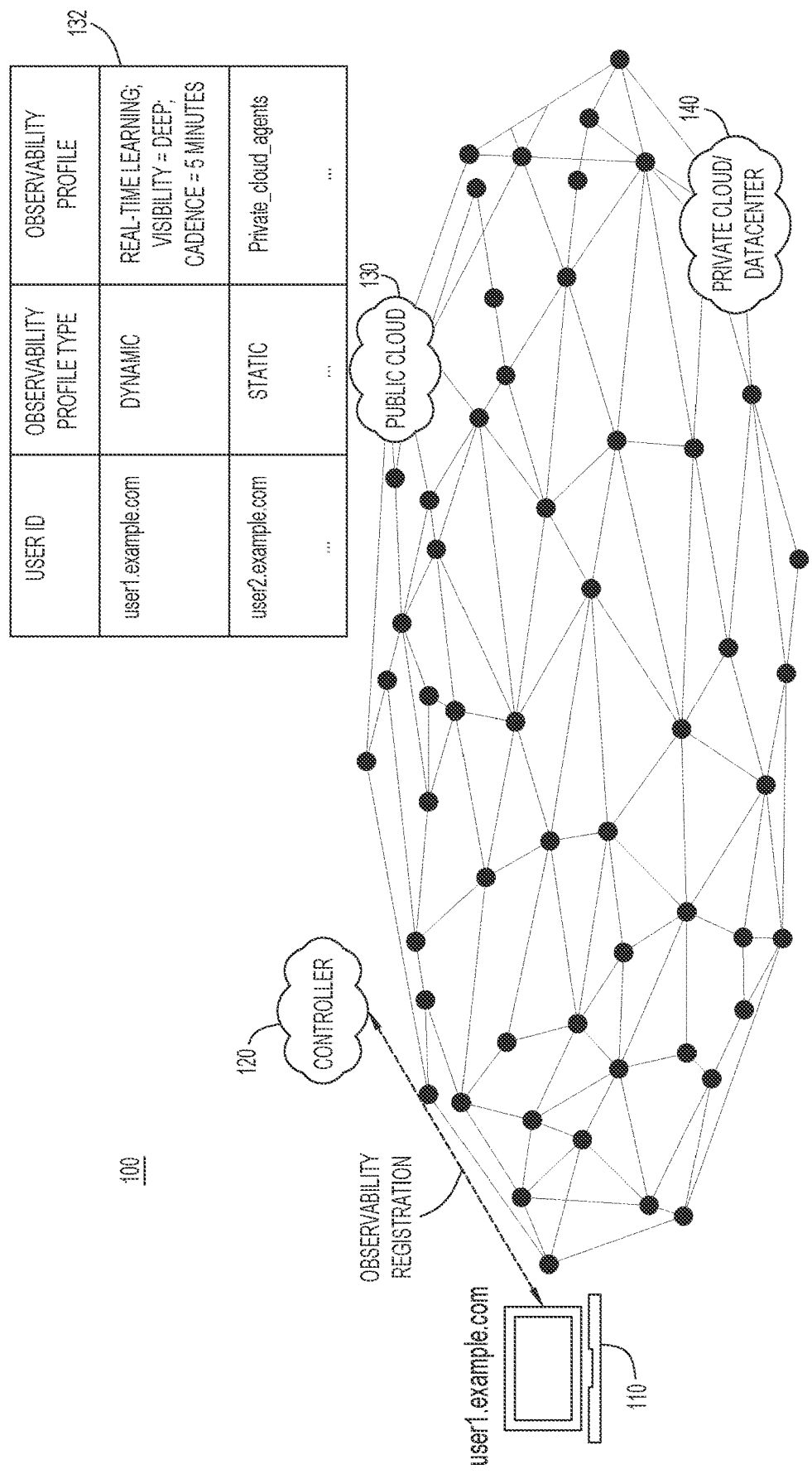
FIG. 1 is a block diagram of a system configured to support identifying an observability profile corresponding to a user for executing observability measurements, according to an example embodiment.

In one embodiment, a method is provided for identifying an observability profile associated with a teleworker and executing measurements based on the observability profile. The method includes receiving, from a user device associated with a user, a connection request that includes an identifier associated with the user, the identifier being associated with a profile, the profile being a static profile or a dynamic profile; identifying an observability profile associated with the user based on the profile when the profile is a static profile and based on a current traffic profile associated with the user device when the profile is a dynamic profile; executing measurements associated with a data session for the user device based on the observability profile; and adjusting one or more configurations in a network to improve performance of the data session based on the measurements.

EXAMPLE EMBODIMENTS

Several observability tools exist that allow customers (e.g., companies, corporations, enterprises, or other customers) to collect and measure performance metrics across a network stack. For example, a synthetic network performance monitoring tool/service has its own set of cloud/enterprise/user/mobile agents that are hosted at different vantage points for network and transport layer measurements. Additionally, an application performance monitoring tool/service has its own agents that are injected as instrumentation code within an end application server for measuring various application performance metrics. There are also existing solutions available to cross-pollinate the information between different tools/services to measure full-stack metrics for holistic performance visibility and optimization.

While these tools allow customers to measure performance between agents at different vantage points, identifying the vantage point is difficult when an employee is working remotely. Unlike executing packet loss test cases between agents on two different data centers where the measurements are shared and applicable to multiple users, a teleworker requires a one-to-one kind of measurement. Therefore, it is essential to identify the right balance to optimally measure performance without compromising the teleworker's day-to-day activities.

Embodiments described herein provide for assigning a static observability profile or a dynamic observability profile to each teleworker associated with an enterprise. When a connection request is received for a teleworker, the observability profile associated with the teleworker's identifier is identified. If the profile is a static profile, an observability profile is identified based on the static profile. The observability profile identifies agents and relevant test cases for executing observability measurements for a data session associated with the user. If the profile is a dynamic profile, real-time analytics capabilities of user software are leveraged to identify the current traffic profile associated with the user. The current traffic profile is used to identify an observability profile for the user. When the observability profile is identified, observability measurements are executed based on the observability profile and the measurements are used for visibility and optimization.

Reference is first made to FIG. 1. FIG. 1 shows a block diagram of an environment 100 that is configured to identity an observability profile corresponding to a user for executing observability measurements. The environment 100 includes a user device 110, a controller 120, a public cloud, and a private cloud/datacenter 140.

User device 110 may be associated with a teleworker who is employed by an enterprise. In the example illustrated in FIG. 1, the teleworker is working remotely from a location that is not associated with the enterprise. When a teleworker is working remotely, the teleworker may attempt to onboard or connect to a network/site associated with the enterprise (e.g., to perform teleworking activities) from an access network associated with the teleworker's home (e.g., via an access network associated with an Internet Service Provider (ISP) associated with the teleworker) or a different location that offers Internet connectivity (e.g., a coffee shop, a hotel, etc.). For example, the teleworker may use user device 110 to access services provided by and/or applications hosted by public cloud 130 and/or private cloud/datacenter 140 via an access network. Private cloud/datacenter 140 may be associated with the enterprise or another entity and may provide services to the teleworker for performing teleworking activities.

User device 110 may be a tablet, laptop computer, desktop computer, Smartphone, virtual desktop client, virtual whiteboard, or any user device now known or hereinafter developed. User device 110 may have a dedicated physical keyboard or touch-screen capabilities to provide a virtual on-screen keyboard to enter text. User device 110 may also have short-range wireless system connectivity (such as Bluetooth™ wireless system capability, ultrasound communication capability, etc.) to enable local wireless connectivity.

In the example described with respect to FIG. 1, the teleworker is associated with an identifier (ID). The identifier identifies the teleworker and consists of a user ID unique to the teleworker and possibly a group ID and/or an organization/enterprise ID. The group ID may correspond to a group associated with the teleworker within the organization/enterprise. For example, the group ID may indicate whether the teleworker is associated with an engineering group, a sales group, a legal group, or a different group within the organization/enterprise. In the example illustrated in FIG. 1, the user ID associated with the teleworker is user1.example.com. In this example, the user ID for the teleworker is "user1" and the organization/enterprise ID is "example.com." In this example, the identifier does not include a group ID.

During the teleworker onboarding process (e.g., when the teleworker is initiating a connection to perform teleworking activities), controller 120 may obtain an identifier associated with the teleworker. Each identifier is associated with an observability profile. The observability profile may indicate the type of test cases to be executed, the type of network metrics that may be collected, and the cadence at which the test cases can be executed for the teleworker. The observability profile may be a static profile or a dynamic profile.

In some embodiments, a determination of whether an observability profile assigned to a user is static or dynamic may be based on a group profile/identifier associated with the user. A group profile/identifier associated with a user may identify the type of traffic that is normally associated with the user. For example, if the user is in a sales group, a large percentage of the user's teleworking activities may be consistently associated with only a few applications (e.g., e-mail applications and sales activity applications), which may be hosted in public or private clouds. Therefore, a user in this group may be assigned a static profile (since the traffic associated with the user is likely consistent) and the static profile may be associated with public and/or private clouds. As another example, if the user is in an engineering group, the user may establish connections to many different types of applications when teleworking and the different applications used by the teleworker may vary. Therefore, the observability profile assigned to the user may be a dynamic profile that is based on real-time learning and traffic patterns.

In other embodiments, a determination of whether to assign a user a static profile or a dynamic profile may be based on a learning profile or traffic patterns associated with the user. For example, if past traffic patterns associated with a particular user over a period of time are highly regular, a static profile may be built for the user based on the past traffic patterns. However, if the learning profile or traffic patterns are dynamic and change periodically, the user may be assigned a dynamic observability profile.

Database 132 illustrates observability profiles that may be associated with users. As illustrated in database 132, the teleworker with the identifier user1.example.com is associated with a dynamic observability profile. In this example, the observability profile associated with the identifier user1.example.com includes real-time learning; visibility=deep; and cadence=5 minutes. This indicates that test cases and agents are to be assigned to the user based on real-time learning of traffic flows associated with the user and that the test cases are to be executed every five minutes. As further shown in database 132, a teleworker with an identifier user2.example.com is associated with a static profile and the observability profile includes private_cloud_agents. In this example, the test cases and agents will be assigned based on user2.example.com primarily accessing applications/services in the private cloud (e.g., private cloud/datacenter 140).

When database 132 is populated with the identifier and observability profile information for a user, observability registration of user device 110 may be performed by controller 120. Controller 120 may be configured, for example, as a software-defined network (SDN) controller associated with the enterprise employing the teleworker. During registration, controller 120 may receive information associated with the user device 110 that is connected to or attempting to connect to a network associated with the enterprise (e.g., via a virtual private network (VPN) tunnel, an Internet Protocol (IP) Security (IPSec) tunnel, a cloud tunnel, etc.). For example, controller 120 may obtain an identifier associated with the user and perform a lookup in database 132 to determine whether an observability profile associated with the user is a static profile or a dynamic profile. Controller 120 may trigger activators based on whether the observability profile is a static profile or a dynamic profile.

If the profile is a static profile, a static and predefined set of agents and test cases may be mapped to the user for execution of observability measurements. The set of agents and test cases are determined based on the observability profile associated with the user. For example, for user2.example.com in database 132, private cloud agents and test cases may be mapped to the user and observability measurements may be executed based on the agents and test cases. The determination of the test cases and agents associated with the observability profile may be based on past traffic patterns or a group associated with the user.

If the profile is a dynamic profile, additional information may be used to identify the agents and test cases to map to the user for performing observability measurements. In one embodiment, a real-time traffic profile may be identified and an observability profile may be identified for the user based on the real-time traffic profile. The observability profile may be used to identify the agents and relevant test cases for executing observability measurements associated with the user's session.

In other embodiments, additional information may be used an input to identify agents and test cases for executing the observability measurements. For example, controller 120 may receive information associated with the user of user device 110, agent information associated with the user device 110, a current location of user device 110, and/or additional information and controller 120 may use the received information to identify the capabilities of the teleworker at the current location.

In some embodiments, additional details about a teleworker's current connection may be used as another input to identify agents and test cases for performing observability measurements. For example, a teleworker connected from a partner site may not need additional measurements if there are existing agents between the partner site and the corporation/enterprise network/site that is measuring different test cases. As another example, if a teleworker is connected from a low bandwidth access network, performance measurements may be executed only for highly critical business application traffic.

In one example, if a teleworker is connected through an open network, such as a hotel Wi-Fi connection or a hotspot, user device 110 may transmit information to controller 120 during registration indicating the type of connection and the agent type associated with the user device 110 for determining test cases for executing measurements. For example, user device 110 may indicate that the user device 110 has an endpoint agent (e.g., such as a browser extension) and a limited amount of compute resources and, therefore, a limited set of test cases may be executed. As another example, if a teleworker is covered with a smart network interface card (NIC) or external compute resources that could be used to host different agents, the agent type may be enterprise and controller 120 may determine that user device 110 is capable of hosting and executing different types of test cases.

Figure 2:
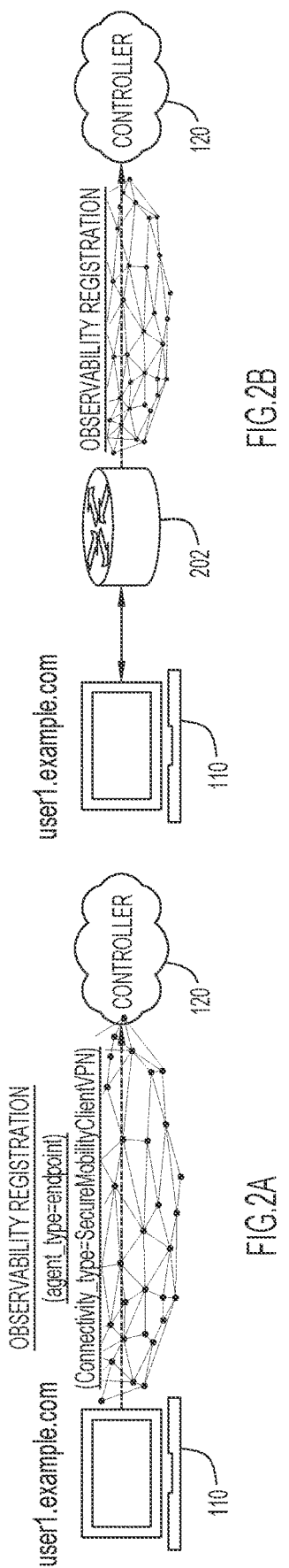
FIGS. 2A and 2B illustrate examples in which observability measurements may be offloaded outside a teleworker's device, according to an example embodiment.

Reference is now made to FIGS. 2A and 2B with continued reference to FIG. 1. FIGS. 2A and 2B illustrate exemplary environments in which connectivity details are transmitted to identify whether observability measurements may be offloaded outside the teleworker. FIGS. 2A and 2B include user device 110, controller 120, and virtual office router 202.

In the example illustrated in FIG. 2A, a user with an identifier of user1.example.com who is onboarding a session using user device 110 may transmit observability registration information to controller 120. The observability registration information may include connectivity details such as, in this example, agent_type=endpoint and connectivity type=SecureMobilityClientVPN. In this example, user device 110 has an endpoint agent (e.g., a browser extension) and is connecting to an enterprise/corporation network/site using a secure mobility client VPN tunnel. In the example, illustrated in FIG. 2B, the user with the identifier user1.example.com is utilizing user device 110 to initiate a session and transmit observability registration information via virtual office router 202. The connectivity information and information associated with virtual office router 202 may be transmitted to controller 120 (in addition to other information) during the observability registration process. Controller 120 may receive the observability registration information received from user device 110 in FIG. 2A or FIG. 2B and use the information to identify if any observability measurements can be offloaded outside of user device 110.

When a teleworker is connected through a VPN tunnel (as illustrated in FIG. 2A), through a router with compute resources (such as virtual office router 202 illustrated in FIG. 2B), through a basic Internet connection with no overlay tunnel, through an IPSec tunnel, through an open roaming access network provider, or through another connection, a third party application hosting capability may be signaled to controller 120 in the observability registration. The third party hosting capability may be used to identify whether any agents and measurements may be offloaded to a compute resource available as close as possible to the teleworker.

As described above with respect to FIGS. 1, 2A, and 2B, the information in the observability registration may be used by controller 120 to determine what types of agents may be leveraged to execute test cases, what type of test cases can be executed, what type of network metrics can be collected, and/or the cadence at which the test cases can be executed. The information in the observability registration may additionally be used to determine whether observability measurements may be offloaded to a third party module. When a teleworker is associated with a dynamic profile, the information in the observability registration may be used in conjunction with a current traffic profile to identify test cases and agents for the observability profile.

Figure 3:
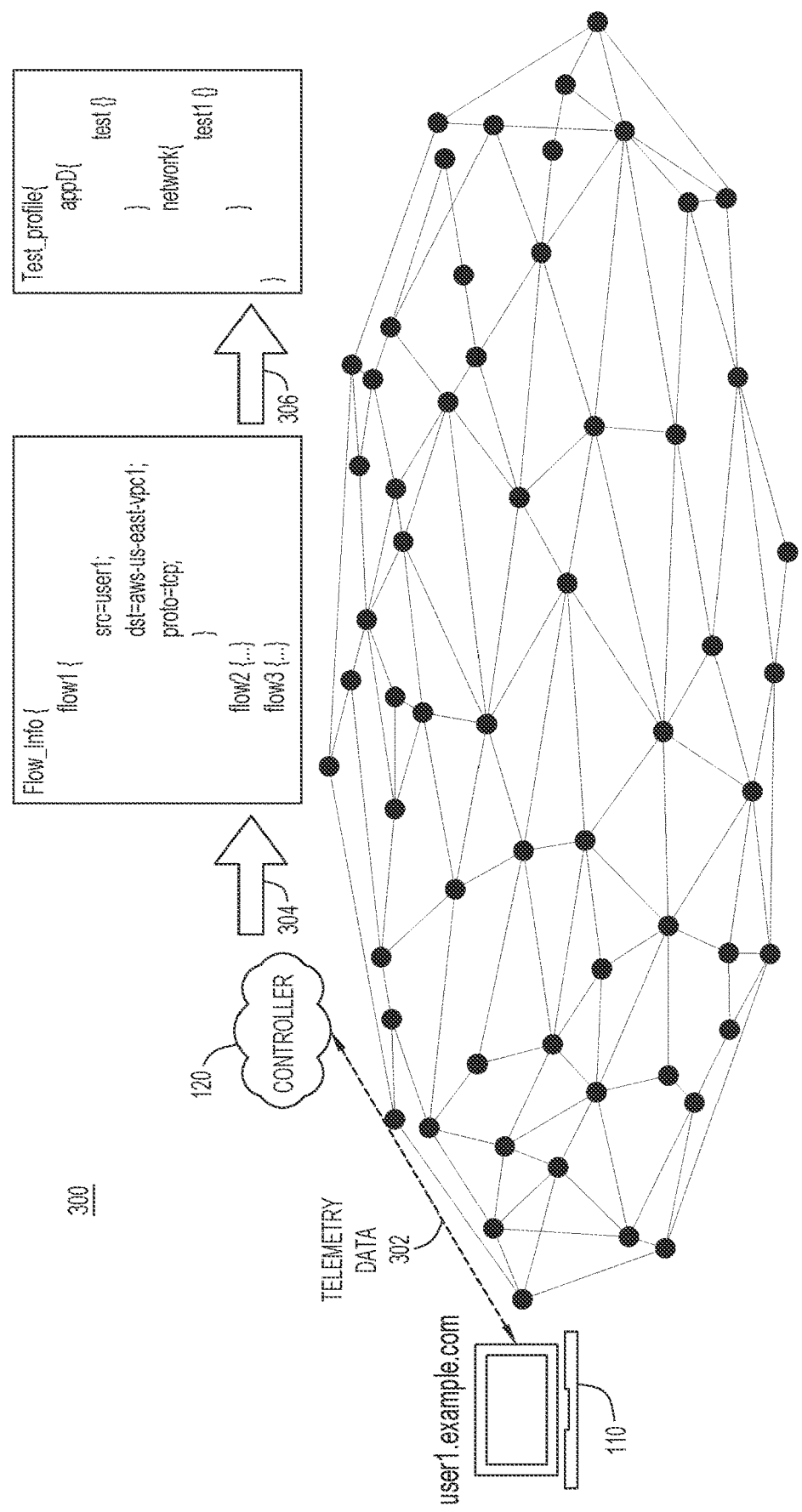
FIG. 3 illustrates an example method in which traffic flow information is converted into a test profile, according to an example embodiment.

Reference is now made to FIG. 3. FIG. 3 shows a diagram illustrating a method 300 of using real-time telemetry data to learn a current traffic pattern for a teleworker for identifying agents and test causes for performing observability measurements. Method 300 may be performed by user device 110 in conjunction with controller 120 and/or additional devices not illustrated in FIG. 3.

In the example illustrated in FIG. 3, a user with the identifier user1.example.com is associated with a dynamic observability profile. As discussed above, when a registered teleworker is associated with a static observability profile, the sets of agents and test cases are identified based on the teleworker's observability profile and it is not necessary to identify a current traffic pattern associated with the teleworker. When a registered teleworker is of a dynamic type, real-time telemetry data may be used to learn the current traffic pattern and the current traffic pattern (in addition to other information described above) may be used to identify agents and test cases for performing observability measurements.

At 302, user device 110 may register with controller 120 and controller 120 may determine that the teleworker using user device 110 is associated with a dynamic profile. Because the teleworker has a dynamic profile, controller 120 may communicate to user device 110 to start collecting real time telemetry data that provides insight about a current traffic profile associated with the teleworker. In some embodiments, if the teleworker is connected through a module (e.g., a secure mobility client VPN module, a virtual office router, etc.,) controller 120 may request that the module provide real-time telemetry data associated with the traffic profile. In other embodiments, the real-time telemetry data may be determined using In-situ Operations, Administration, and Maintenance (iOAM) processes, which provide real-time telemetry of individual data packets and flows. The real-time telemetry data may additionally or alternatively be determined using other mechanisms.

At 304, controller 120 may perform continuous analytics on the traffic flows to identify the percentages of the user device 110 traffic destined for different parts of the network (e.g., Internet, Public, Private-Cloud/Software as a Service (SaaS), etc.). Controller 120 may identify different flows associated with the teleworker and may determine information (e.g., a source, a destination, a protocol, etc.) associated with each flow. For example, one flow may be associated with online meeting application traffic, another flow may be associated with e-mail application traffic, and other flows may be associated with applications/services associated with other teleworking activities. Each flow may be destined for applications/services hosted in different regions.

As illustrated in FIG. 3, flow1, flow2, and flow3 have been identified for user user1.example.com. In this example, for flow1, the source is user1, the destination is an AWS cloud (aws-us-eas-vpc1), and the protocol is a transmission control protocol (TCP). This indicates that there is a heavy flow of TCP traffic from the teleworker to an application hosted in the AWS-East region.

At 306, the flow information is converted into an observability profile. The observability profile includes information associated with test cases and agents in different areas for executing measurements associated with a data session. For example, flow1 is converted into a profile that requires TCP measurements on a path from an end-user agent at user device 110 (and/or other agents near the teleworker, such as agents at a secure mobility client module, agents at a virtual office router, agents at a third party application, etc.) to the AWS East virtual private cloud (VPC). Therefore, the observability profile includes information about any relevant agents between user device 110 and the AWS East VPC and the test cases to be executed by the agents to provide metrics associated with the data flow. As described below with respect to FIG. 4, after the flow information has been converted into an observability profile, the observability profile is transmitted to one or more observability controllers to execute relevant test cases on relevant agents based on the profile.

In other embodiments, real-time traffic learning may also be used to learn the behavior of the teleworker to predict the potential traffic profile from the user. For example, the real-time traffic learning may be used to predict the traffic profiles from different locations, on different days, from different times of the day, etc. The predicted traffic profile may be used to determine relevant agents and test cases.

Figure 4:
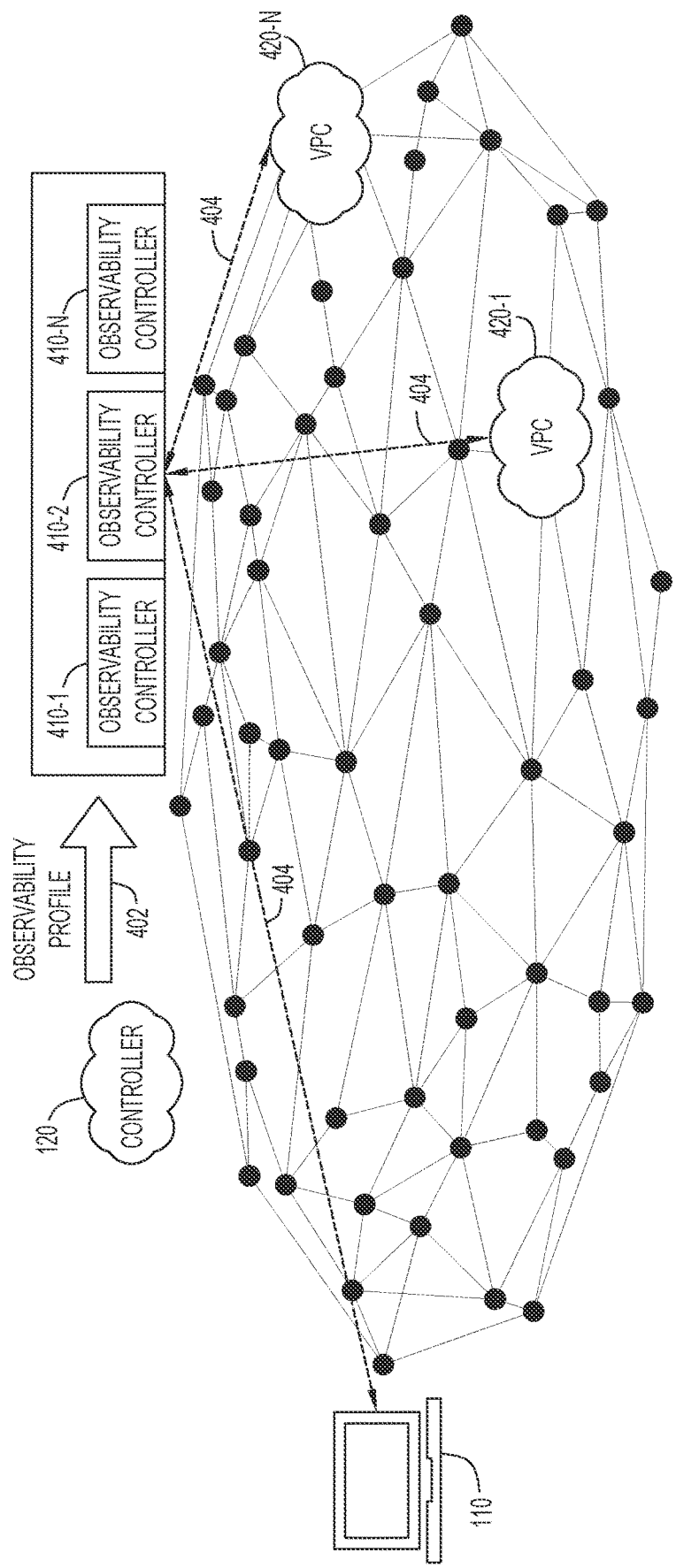
FIG. 4 illustrates an example environment in which test cases are executed on agents, according to an example embodiment.

Reference is now made to FIG. 4. FIG. 4 shows a block diagram of an environment that is configured to execute test cases on agents based on an observability profile associated with a teleworker. The environment includes user device 110, controller 120, observability controllers 410-1, 410-2, . . . 420-N, and VPCs 420-1 through 420-N. Although three observability controllers and two VPCs are illustrated in FIG. 4, the environment may include any number of observability controllers and VPCs.

As illustrated in FIG. 4, at 402, the observability profile is transmitted to observability controllers 410-1 to 410-N. The observability profile may be pre-defined if the teleworker is associated with a static profile (e.g., the observability profile may be based on past traffic patterns associated with the teleworker). Alternatively, if the teleworker is associated with a dynamic profile, the observability profile may be based on the current traffic pattern, traffic flows, current connectivity, and/or additional information, as described above with respect to FIGS. 1, 2A, 2B, and 3. Each observability controller 410-1 to 410-N may be associated with a particular aspect of the network stack. For example, an observability controller may be a controller associated with an application performance monitoring tool/service, a synthetic network performance monitoring tool/service, and/or an additional performance monitoring tool/service.

At 404, observability controllers 410-1 to 410-N may transmit relevant test cases to relevant agents based on the received observability profile for executing the test cases to collect metrics for visibility and optimization. In the example illustrated in FIG. 4, observability controllers 410-1 to 410-N execute relevant test cases on agents at user device 110, VPC 420-1, and VPC 420-N. VPC 420-1 and VPC 420-N may be located in areas associated with the identified flows associated with user device 110. By executing the relevant test cases on the agents relevant to the observability profile, metrics for flows between user device 110 and clouds hosting applications/services being accessed by user device 110 may be collected. In addition, measurements may be made with respect to traffic destined for user device 110 that may not originate at an instance that receives a request from user device 110.

The executed measurements may be used for visibility and optimization. For example, the measurements may be used to identify any performance issues within the network stack that may be addressed. In addition, the measurements may be used for optimization of the network stack. For example, updates may be implemented for nodes within the network stack based on the executed measurements.

Figure 5:
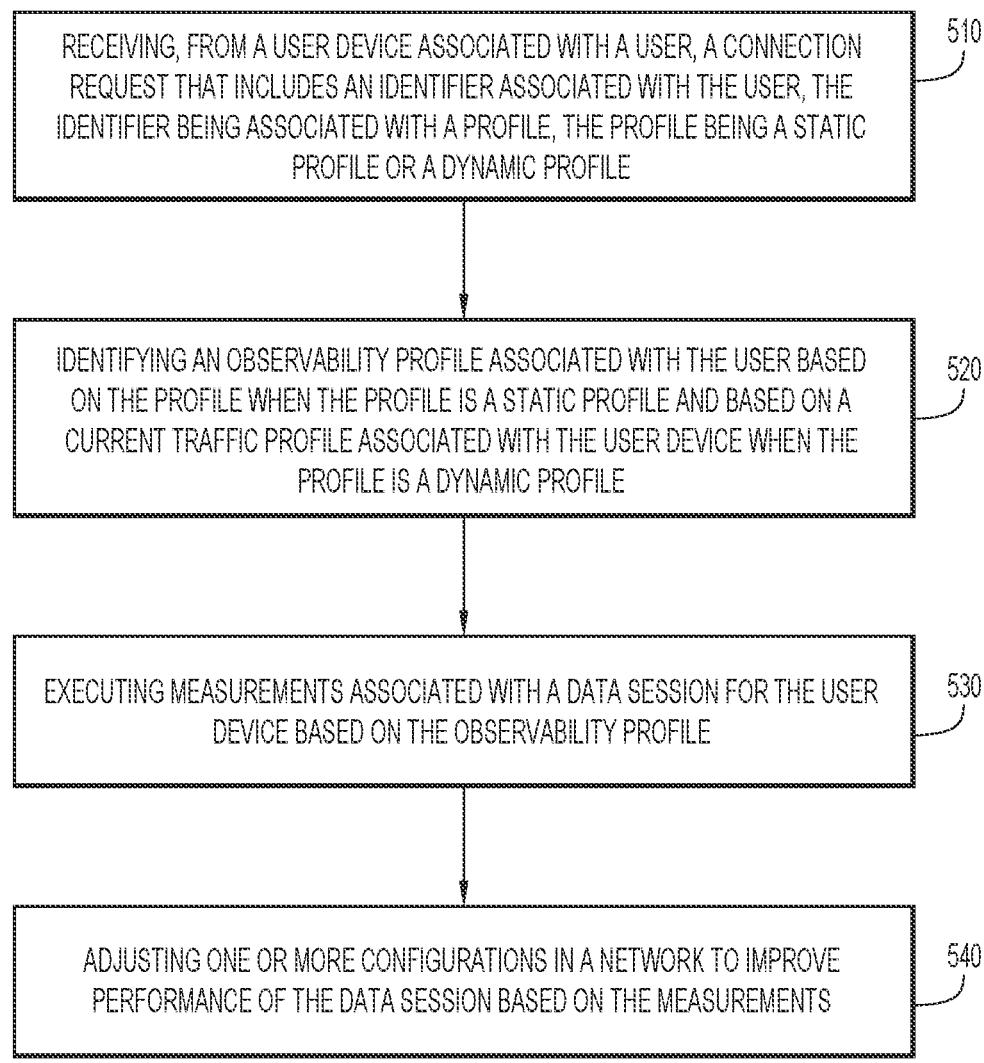
FIG. 5 is a flow diagram illustrating a method of identifying an observability profile for executing test cases on agents, according to an example embodiment.

Reference is now made to FIG. 5. FIG. 5 is a flow diagram illustrating a method 500 of determining a probable cause of a performance event. Method 500 may be performed by controller 120 in combination with other devices, systems, and/or nodes (e.g., user device 110, observability controllers 410-1 to 410-N, VPCs 420-1 to 420-N, etc.).

At 510, a connection request is received from a user device associated with a user. The connection request includes an identifier associated with the user. The identifier is associated with a profile that is a static profile or a dynamic profile. For example, controller 120 may receive a connection request from a user of user device 110. The connection request includes an identifier associated with the user and controller 120 performs a lookup (e.g., in database 132) to identify whether a profile associated with the identifier is a static profile or a dynamic profile.

At 520, an observability profile associated with the user is identified. When the profile is a static profile, the observability profile is identified based on the profile associated with the user. For example, when the profile is a static profile, the observability profile may be identified from database 132. In this situation, the observability profile may be based on past traffic patterns associated with the user. When the profile is a dynamic profile, the observability profile is based on a current traffic profile associated with the user device. In some embodiments, the observability profile may be determined based on a current traffic pattern associated with the user and/or additional information (e.g., a connection type associated with the user, traffic flows associated with the data session, third party modules associated with the connection, etc.). The observability profile may include information associated with relevant agents and test cases to execute for obtaining observability measurements for the user.

At 530, measurements associated with a data session for the user device are executed based on the observability profile. For example, controller 120 may transmit the observability profile to observability controllers 410-1 to 410-N and observability controllers 410-1 to 410-N may transmit the relevant test cases to agents hosted on nodes (e.g., user device 110, VPC 420-1 to 420-N, etc.) for executing observability measurements. The test cases and agents may be identified based on information in the observability profile.

At 540, one or more configurations are adjusted in a network to improve performance of the data session based on the measurements. For example, the measurements may be used to optimize performance across the network stack.

Figure 6:
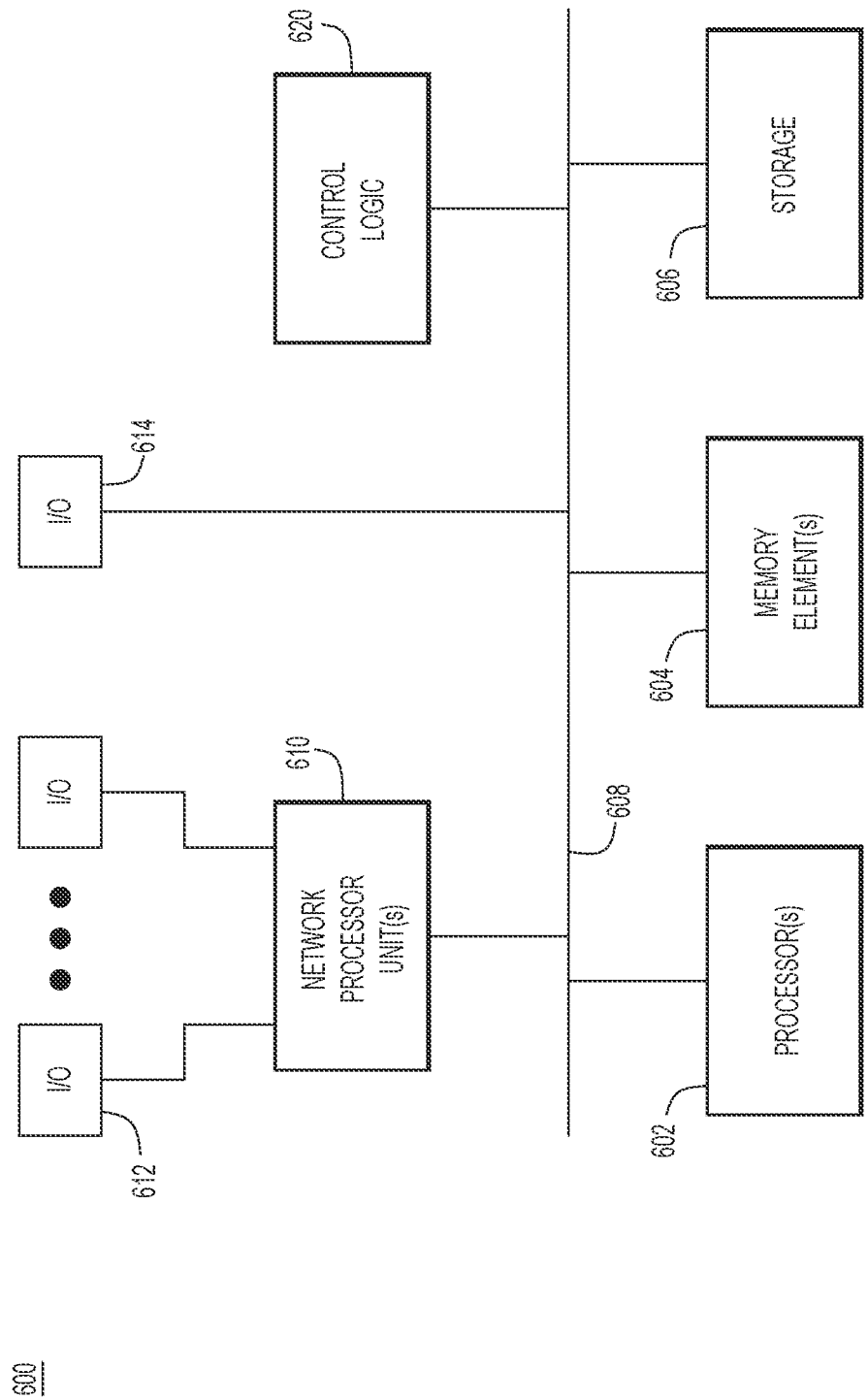
FIG. 6 is a hardware block diagram of a device that may be configured to perform the operations involved in identifying an observability profile for executing test cases on agents, according to an example embodiment.

Referring to FIG. 6, FIG. 6 illustrates a hardware block diagram of a computing/computer device 600 that may perform functions of a device associated with operations discussed herein in connection with the techniques depicted in FIGS. 1, 2A, 2B, and 3-5. In various embodiments, a computing device, such as computing device 600 or any combination of computing devices 600, may be configured as any devices as discussed for the techniques depicted in connection with FIGS. 1, 2A, 2B, and 3-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. This may be the case, in particular, when the computing device 600 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, particularly when the computing device 600 serves as a user device as described herein.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided comprising receiving, from a user device associated with a user, a connection request that includes an identifier associated with the user, the identifier being associated with a profile, the profile being a static profile or a dynamic profile; identifying an observability profile associated with the user based on the profile when the profile is a static profile and based on a current traffic profile associated with the user device when the profile is a dynamic profile; executing measurements associated with a data session for the user device based on the observability profile; and adjusting one or more configurations in a network to improve performance of the data session based on the measurements.

In one example, the user is a teleworker and the connection request is a connection request for accessing services for performing teleworking activities. In another example, the observability profile includes information associated with monitoring agents in the network and test cases for executing the measurements. In another example, the measurements indicate performance metrics across a network stack associated with the data session. In another example, when the profile is a static profile, the observability profile is based on past traffic patterns associated with the user.

In another example, executing the measurements comprises transmitting the observability profile to one or more observability controllers for executing test cases on one or more monitoring agents in the network. In another example, when the profile is a dynamic profile, the current traffic profile is determined based on real-time telemetry data. In another example, the method further comprises determining whether the profile associated with the user is a static profile or a dynamic profile is based on past traffic patterns associated with the user.

In another form, a system is provided comprising: one or more memories storing instructions; and one or more processors, operatively coupled to the one or more memories, configured to execute the instructions to perform operations comprising: receiving, from a user device associated with a user, a connection request that includes an identifier associated with the user, the identifier being associated with a profile, the profile being a static profile or a dynamic profile; identifying an observability profile associated with the user based on the profile when the profile is a static profile and based on a current traffic profile associated with the user device when the profile is a dynamic profile; executing measurements associated with a data session for the user device based on the observability profile; and adjusting one or more configurations in a network to improve performance of the data session based on the measurements.

In yet another form, one or more non-transitory computer readable storage media encoded with instructions are provided that, when executed by a processor of a user device, cause the processor to execute a method comprising: receiving, from a user device associated with a user, a connection request that includes an identifier associated with the user, the identifier being associated with a profile, the profile being a static profile or a dynamic profile; identifying an observability profile associated with the user based on the profile when the profile is a static profile and based on a current traffic profile associated with the user device when the profile is a dynamic profile; executing measurements associated with a data session for the user device based on the observability profile; and adjusting one or more configurations in a network to improve performance of the data session based on the measurements.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

What is claimed is:

1. A computer-implemented method comprising:
    receiving, from a user device associated with a user, a connection request that includes an identifier associated with the user, the identifier being associated with a profile, the profile being a static profile or a dynamic profile, wherein the user is associated with the static profile or the dynamic profile;
    identifying an observability profile associated with the user, wherein identifying the observability profile comprises:
        identifying the observability profile from the profile when the profile is a static profile, and
        identifying the observability profile based on a current traffic profile associated with the user device when the profile is a dynamic profile;
    executing measurements associated with a data session for the user device based on the observability profile, wherein the measurements that are executed are based on whether the profile is a static profile or a dynamic profile; and
    adjusting one or more configurations in a network to improve performance of the data session based on the measurements.

2. The computer-implemented method of claim 1, wherein the user is a teleworker and the connection request is a connection request for accessing services for performing teleworking activities.

3. The computer-implemented method of claim 1, wherein the observability profile includes information associated with monitoring agents in the network and test cases for executing the measurements.

4. The computer-implemented method of claim 1, wherein the measurements indicate performance metrics across a network stack associated with the data session.

5. The computer-implemented method of claim 1, wherein, when the profile is a static profile, the observability profile is based on past traffic patterns associated with the user.

6. The computer-implemented method of claim 1, wherein executing the measurements comprises transmitting the observability profile to one or more observability controllers for executing test cases on one or more monitoring agents in the network.

7. The computer-implemented method of claim 1, wherein, when the profile is a dynamic profile, the current traffic profile is determined based on real-time telemetry data.

8. The computer-implemented method of claim 1, further comprising determining whether the profile associated with the user is a static profile or a dynamic profile is based on past traffic patterns associated with the user.

9. A system comprising:
one or more memories storing instructions; and
one or more processors, operatively coupled to the one or more memories, configured to execute the instructions to perform operations comprising:
receiving, from a user device associated with a user, a connection request that includes an identifier associated with the user, the identifier being associated with a profile, the profile being a static profile or a dynamic profile, wherein the user is associated with the static profile or the dynamic profile;
identifying an observability profile associated with the user, wherein, when identifying the observability profile, the instructions are executed to perform operations comprising:
identifying the observability profile from the profile when the profile is a static profile, and
identifying the observability profile based on a current traffic profile associated with the user device when the profile is a dynamic profile;
executing measurements associated with a data session for the user device based on the observability profile, wherein the measurements that are executed are based on whether the profile is a static profile or a dynamic profile; and
adjusting one or more configurations in a network to improve performance of the data session based on the measurements.

10. The system of claim 9, wherein the user is a teleworker and the connection request is a connection request for accessing services for performing teleworking activities.

11. The system of claim 9, wherein the observability profile includes information associated with monitoring agents in the network and test cases for executing the measurements.

12. The system of claim 9, wherein the measurements indicate performance metrics across a network stack associated with the data session.

13. The system of claim 9, wherein, when the profile is a static profile, the observability profile is based on past traffic patterns associated with the user.

14. The system of claim 9, wherein, when executing the measurements, the one or more processors are further configured to perform operations comprising:
transmitting the observability profile to one or more observability controllers for executing test cases on one or more monitoring agents in the network.

15. The system of claim 9, wherein, when the profile is a dynamic profile, the current traffic profile is determined based on real-time telemetry data.

16. The system of claim 9, wherein the one or more processors are further configured to perform operations comprising:
determining whether the profile associated with the user is a static profile or a dynamic profile is based on past traffic patterns associated with the user.

17. One or more non-transitory computer readable storage media encoded with instructions that, when executed by a processor of a user device, cause the processor to execute a method comprising:
receiving, from a user device associated with a user, a connection request that includes an identifier associated with the user, the identifier being associated with a profile, the profile being a static profile or a dynamic profile, wherein the user is associated with the static profile or the dynamic profile;
identifying an observability profile associated with the user, wherein identifying the observability profile comprises:
identifying the observability profile from the profile when the profile is a static profile, and
identifying the observability profile based on a current traffic profile associated with the user device when the profile is a dynamic profile;
executing measurements associated with a data session for the user device based on the observability profile, wherein the measurements that are executed are based on whether the profile is a static profile or a dynamic profile; and
adjusting one or more configurations in a network to improve performance of the data session based on the measurements.

18. The one or more non-transitory computer readable storage media of claim 17, wherein the user is a teleworker and the connection request is a connection request for accessing services for performing teleworking activities.

19. The one or more non-transitory computer readable storage media of claim 17, wherein the observability profile includes information associated with monitoring agents in the network and test cases for executing the measurements.

20. The one or more non-transitory computer readable storage media of claim 17, wherein the measurements indicate performance metrics across a network stack associated with the data session.

* * * * *